Aug. 16, 1932.  F. F. STARR  1,871,926
ELECTRICAL APPARATUS
Filed July 29, 1929
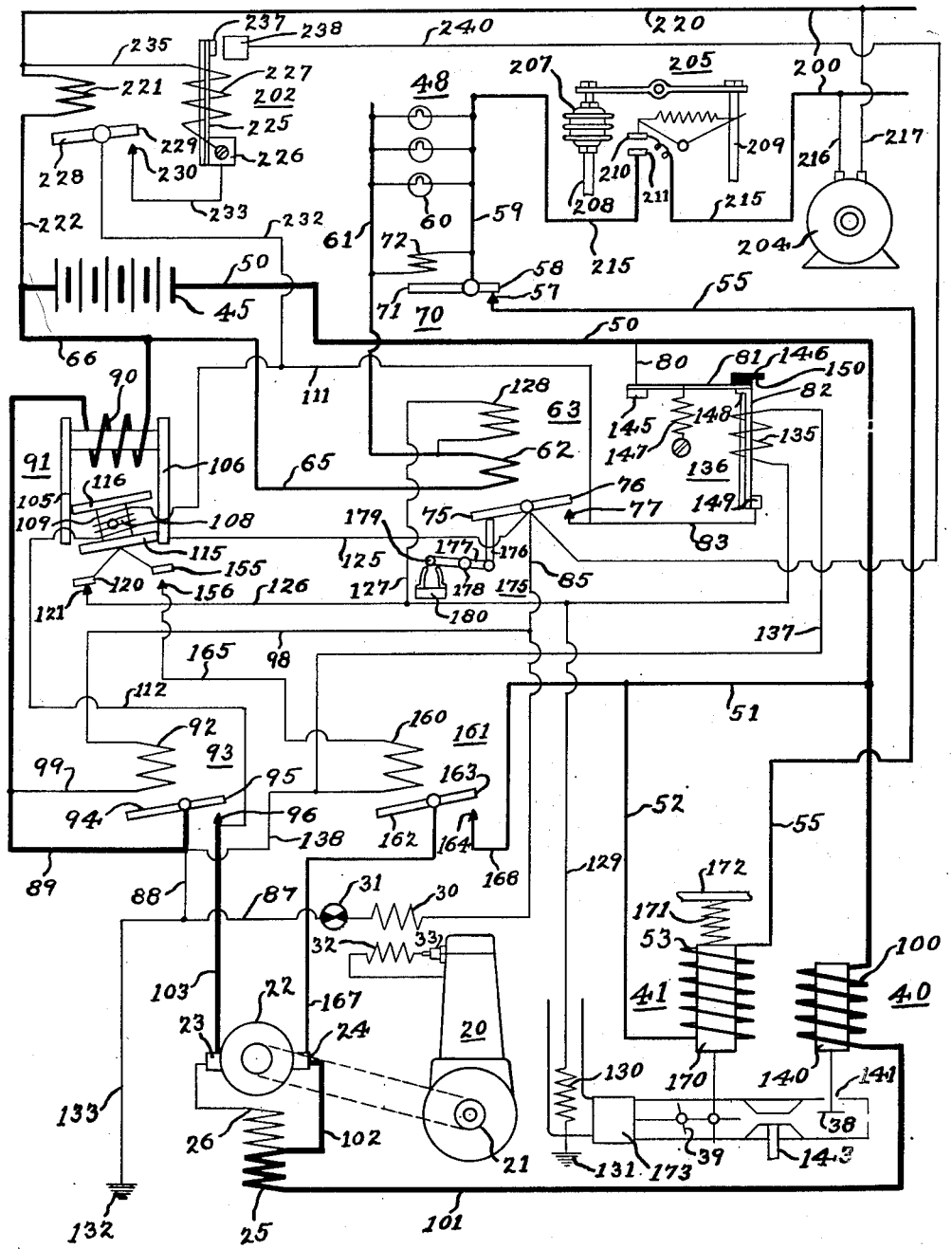
INVENTOR
Frank F. Starr
BY Spencer, Hardman & Fehr
ATTORNEY Patented Aug. 16, 1932

1,871,926

UNITED STATES PATENT OFFICE

FRANK F. STARR, OF DAYTON, OHIO, ASSIGNOR TO DELCO-LIGHT COMPANY, OF DAYTON, OHIO, A CORPORATION OF DELAWARE

ELECTRICAL APPARATUS

Application filed July 29, 1929. Serial No. 382,027.

The present invention relates to electrical generating systems.

One of the objects of the present invention is to provide an improved electrical generating system including electrical apparatus, such as a dynamo, and a storage battery, which system will start automatically in response to a demand for current by the work circuit, but in which the electrical apparatus will not be rendered operative to supply the demand for predetermined length of time.

In carrying out this idea of the invention it is a further object to provide a work circuit containing translating devices requiring large amounts of current and to arrange the work circuit in such a manner that a demand for current by a device contained in the work circuit will be supplied current from the battery for rendering the device operative, and a demand for current by the device for a predetermined length of time will render the electrical apparatus operative to supply such demand, thereby preventing a simultaneous demand on the storage battery by the device, for starting the same, and a demand for cranking current for rendering the system operative. One manner of preventing the operation of the electrical apparatus for a predetermined length of time is to provide a switch, thermostatically operated, for controlling the necessary electrical circuits for rendering the electrical apparatus operative, and for maintaining such operation as long as there is a demand for current.

Further objects and advantages of the present invention will be apparent from the following description, reference being had to the accompanying drawing, wherein a preferred form of the present invention is clearly shown.

In the drawing:

The figure in the drawing is a wiring diagram illustrating the present invention.

Referring to the drawing 20 designates a prime mover herein shown, for generally the purpose of illustration, as an internal combustion engine having a shaft 21 which drives an electrical apparatus or dynamo 22 having main brushes 23 and 24 connected to the armature of the dynamo, and having a starting series field winding 25 and a shunt field winding 26.

The ignition apparatus comprises an ignition coil primary 30, an ignition timer 31 and an ignition coil secondary 32 which is connected to an engine spark plug 33.

A choke 38 for forming a proper mixture of gasoline and air for starting the prime mover, and a throttle 39 for regulating the speed of the prime mover, are adapted to be actuated by the controls 40 and 41 respectively.

The dynamo 22 functions as a motor or as a generator, and is adapted to rotate the shaft 21 of the prime mover 20, when acting as a starting motor, receiving current from a storage battery 45. During the starting of the prime mover 20, the current through the series winding 25 and the shunt winding 26 is cumulative to produce a sufficient starting torque for cranking the prime mover.

When the load demand on a lighting circuit 48 is less than a predetermined value, the storage battery 45 is adapted to supply such demand. The current to the lighting circuit 48 will flow from the battery 45 through the following circuit: battery 45, wire 50, wire 51, wire 52, winding 53 of control 41, wire 55, contacts 57 and 58, service main 59, small translating device 60, service main 61, current coil 62 of a starting switch relay 63, wire 65 and wire 66 to the other side of the battery.

A low voltage cut-out 70 is adapted to separate contacts 57 and 58 when the voltage of the battery is abnormally low. The low voltage cut-out 70 includes a pivoted armature 71 which carries the contact 58, and a magnet coil 72 having its ends connected across the lighting circuit 48 in parallel with the translating devices 60. When the voltage of the battery 45 is less than a predetermined low value, the coil 72 will not be energized sufficiently to hold the armature 71 in the position shown in the drawing. Thus the armature 71 will descend by gravity to separate contact 57 from contact 58, thereby interrupting the flow of current from the battery 45 to the work circuit 48.

When there is a load demand for current by the lighting circuit 48 in excess of a predetermined value, for example seven amperes, the ampere turns of the current coil 62 of the starting switch relay 63 are sufficient to lift the armature 75 upwardly to engage a contact 76 with a contact 77. The closing of contacts 76 and 77 allows current to flow from the battery 45 through the ignition and various other circuits necessary for rendering the prime mover 20 automatically operative to drive the dynamo 22 to supply current to the work circuit 48 and battery 45. The circuit from the battery 45 to the ignition is as follows: battery 45, wire 50, wire 80, blade 81, bi-metallic thermostatic blade 82, wire 83, contacts 77 and 76, wire 85, ignition coil primary 30, timer 31, wire 87, wire 88, wire 89, series winding 90 of a reverse current relay 91 and wire 66 to the other side of the battery. The closing of contacts 76 and 77 also allows current to flow from the battery 45 to a magnet coil 92 of a starting switch 93. The starting switch 93 includes the coil 92 and a pivoted armature 94 which carries a contact 95. The energizing of the coil 92 will cause the armature 94 to be drawn upwardly to engage contact 95 with a contact 96. The circuit from the battery 45 through the coil 92 is as follows: battery 45, wire 50, wire 80, blades 81 and 82, wire 83, contacts 77 and 76, wire 85, wire 98, magnet coil 92, wire 99, wire 89, winding 90, and wire 66 to the other side of the battery.

The closing of contacts 95 and 96 of the starting switch 93 establishes a cranking circuit between the battery and the dynamo which is as follows: battery 45, wire 50, winding 100 of the control 40, wire 101, series winding 25 of dynamo 22, wire 102, dynamo 22, wire 103, contacts 96 and 95, wire 89, series winding 90 of reverse current relay 91 and wire 66 to the other side of the battery.

The current flowing through the series winding 90 of the reverse current relay 91 during cranking is adapted to magnetize the frame of relay 91 including side plates or pole pieces 105 and 106 whereby said plates 105 and 106 will be, for example, north and south poles respectively. The relay 91 also includes a rocking armature 108 having a shunt winding 109, which winding is connected across the battery 45. The circuit from the battery 45 to the shunt winding 109 is as follows: battery 45, wire 50, wire 80, blades 81 and 82, wire 83, wire 111, shunt winding 109, wire 112, contacts 96, and 95, wire 89, series winding 90 and wire 66 to the other side of the battery. The armature 108 includes side plates 115 and 116 which blades are adapted to be magnetized north and south poles respectively, by shunt winding 109. When no current is flowing in the windings 90 and 109, armature 108 is in the position shown, it being resiliently held in such position by a spring (not shown). When the current flows through the series winding 90 during cranking, like poles of the relay frame of armature will repel to further assist in maintaining a rocking armature 108 in the position shown, whereby contact 120 engages contact 121.

The engagement of contacts 120 and 121 allows current to flow from the battery through the following circuit when contacts 76 and 77 of relay 63 are closed: battery 45, wire 50, wire 80, blades 81 and 82, wire 83, contacts 77 and 76, wire 125, side plates 106 of relay 91, contacts 120 and 121, wire 126, wire 127, shunt winding 128 of the starting switch relay 63, then back to the opposite side of the battery through the winding 62 and wires 65 and 66; also current from wire 126 flows through wire 129 to pre-heater 130 grounded at 131, the circuit being completed through the ground 132, wire 133, wire 88, wire 89, winding 90 and wire 66; and current also flows from wire 126 through a heating coil 135 of a cranking cut-out 136, wires 137 and 138, wire 89, winding 90 and wire 66 to the other side of the battery. The pre-heater 130 is adapted to heat the starting fuel mixture for the prime mover 20. During cranking operation the current flows through the shunt winding 128 of relay 63 to cooperate with the current coil 62 to insure maintaining of contact between contacts 76 and 77.

The flow of current through the magnet coil 100 of the choke control 40 tends to raise the control plunger 140 upwardly which plunger carries the choke 38. The upward movement of the plunger 140 will cause the choke 38 to shut off the air passage 141, thus decreasing the quantity of air and consequently allowing a greater volume of gasoline to pass through a pipe 143 and into the carburetor to thus provide a relatively rich starting fuel mixture for a prime mover. The control 40 is adapted to function for a short interval, namely, only when a heavy demand for current is made on the battery 45 during cranking which heavy demand is present for a short interval.

Thus when there is a predetermined demand by the lighting circuit 48 the prime mover 20 will be started by supplying ignition thereto and cranking by the starting series field winding 25 in conjunction with the shunt field winding 26 of the dynamo 22. The starting being aided by enriching the fuel mixture and heating such mixture.

If the prime mover 20 should not start within a certain length of time, abnormal discharge of the battery is prevented by the cranking cut-out 136 which includes the blade 81 and bi-metallic thermostatic blade 82 and the heating coil 135. The blade 81 is fixed at 145 and has a non-conducting block 146 secured thereto. The blade 81 is urged downwardly by a spring 147 to engage a flanged end 148 of the bi-metallic thermostatic blade 82, said blade being fixed at 149. The thermostatic blade 82 is in heat receiving relation to the heating coil 135. While the prime mover is cranking current is passing through this heating coil as previously described. If the cranking of the prime mover should continue for an abnormal period, for example, one to two minutes, the thermostatic blade 82 will be heated sufficiently to cause it to bow to the right, as viewed in the drawing, until the flanged end 148 moves to the right far enough to break its engagement with the blade 81 and is then retained in a shoulder 150 of the non-conducting block 146 by the downward movement of the blade 81. The separation of blades 81 and 82 will interrupt the flow of current to the ignition, shunt 128 of relay 63, shunt winding 109 of reverse current relay 91, heating coil 135 of the cranking cut-out 136, the fuel pre-heating coil 130 and the coil 92 of starting switch 93. When coil 92 is deenergized the armature 94 will descend by gravity to separate contact 95 from contact 96, thus the starting circuit will be interrupted.

During normal operation, when the prime mover becomes self-operative and attains a certain speed the dynamo will function as a differentially wound generator, the current flowing from the dynamo to the battery over the cranking circuit. The current flowing through the series winding 90 of the reverse current relay 91 will be reversed from that during cranking, since this winding is in series with the dynamo 22 and battery 45 and in series with the work circuit 48. This causes a reversal of magnetism in the relay side plates 105 and 106, and consequently the like pole of the armature side plates 115 and 116 will be moved away from the like pole of the relay side plates causing the armature 108 to pivot and to separate contact 120 from contact 121 and cause contact 155 to engage a contact 156. Thus the flow of current through the pre-heater 130, heating coil 135 and winding 128 of relay 63 will be interrupted, the contacts 76 and 77 of relay 63 then being controlled entirely by the winding 62.

The closing of contacts 155 and 156 allows current to flow from the dynamo 22 to a magnet coil 160 of a series shorting switch 161. The switch 161 also includes armature 162 which carries a contact 163. The energizing of coil 160 will draw the armature 162 upwardly to engage contact 163 with a contact 164. The current from the dynamo through the magnet coil 160 is as follows: dynamo 22, wire 102, series winding 25, wire 101, magnet coil 100, wire 50, wire 80, blades 81 and 82, wire 83, contacts 77 and 76, wire 125, side plates 106, contacts 155 and 156, wire 165, magnet coil 160, wire 138, contacts 95 and 96, wire 103 to the other side of the dynamo.

The closing of contacts 163 and 164 allows current to flow from the brush 24 of the dynamo 22 through the wire 167, contacts 163 and 164, wire 168, and wire 51 which joins with wire 50 and thus short-circuits the series field 25 of the dynamo 22 and the choke coil 100 of the control 40 since the circuit just described offers less resistance than the circuit through the series field 25 and coil 85.

The dynamo 22 then functions as a shunt wound generator and supplies current to the translating device or lights 60 in the lighting circuit 48 and supplies charging current to the battery 45. The flow of current from the dynamo 22 through the work circuit is as follows: dynamo 22, wire 167, contacts 163 and 164, wire 168, wire 52, magnet coil 53 of the throttle control 41, wire 55, contacts 57 and 58, service main 59, translating devices 60, service main 61, current coil 62 of relay 63, wire 65, wire 66, series winding 90, wire 89, contacts 95 and 96 and wire 103. The flow of current from the dynamo 22 through the battery charging circuit is as follows: dynamo 22, wire 167, contacts 163 and 164, wire 168, wire 51, wire 50, battery 45, wire 66, series winding 90, wire 89, contacts 95 and 96 and wire 103.

When the dynamo 22 is operative to supply current to the battery 45 and work circuit 48, the control 41 functions to regulate the speed of the prime mover 20 to drive the dynamo 22 to supply current in accordance with the demand for current by the work circuit 48. The control 41 includes the winding 53, a plunger 170 operatively connected with the throttle 39, a spring 171 interposed between the control housing 172 and the plunger 170 and a weight 173. Current flowing through the winding 53 tends to draw the plunger upwardly to open the throttle, while the spring 171 tends to oppose the winding 53 to move the plunger 170 downwardly to close the throttle. As the current through the winding 53 increases the ampere turns are thereby increased, consequently the magnetic effect of the winding 53 will be increased sufficiently to move the plunger 170 upwardly to open the throttle to such an extent as will be necessary to accelerate the prime mover 20 to drive the dynamo 22 to supply current in accordance to the demand by the work circuit. As the flow of current through the winding 53 is decreased the opposing force of the spring 171 will be sufficient to move the plunger 170 downwardly to close the throttle proportionally to the load demand. The weight 173 is adapted to slightly overbalance the weight of the plunger 170 and hold the same in contact with the spring 171 when the winding 53 is deenergized. By this arrangement the plunger will be moved upwardly or downwardly by a steady movement depending upon the increase or decrease of current in the winding 53. Since the winding 53 is disposed in the supply circuit to the service mains, the speed of the prime mover will be controlled in accordance to the demand by the work circuit.

When it is desired to supply a charging current to the battery 45 and there is no load demand by the work circuit 48 for rendering the prime mover automatically operative, an actuating and locking device 175 may be manually operated to engage contact 76 with contact 77 to complete the necessary electrical circuits for starting the prime mover. The locking device 175 includes the plunger 176, cross-rod 177 which is pivoted at 178, said cross-rod having an arm 179 secured thereto and a locking clasp 180. The downward movement of the arm 179 will cause the plunger 176 to urge the armature 75 upwardly to engage contact 76 with contact 77. The locking clasp 180 is adapted to receive the arm 179 to hold the device in position to prevent contact 76 from becoming separated from contact 77.

In the event the prime mover 20 is idle, and there is a demand for current by the work circuit 200, the prime mover will be rendered automatically operative to drive the electrical apparatus 22 to supply the demand. However, the operation of the prime mover 20 is delayed for a predetermined length of time by a thermostatically controlled switch 202 which switch is described hereinafter.

An electric motor 204, for example, is shown connected across the power circuit 200 and is used, for example, for driving a refrigerating compressor, and is controlled by a switch 205. The switch 205 includes a bellows 207 having a pipe 208 which pipe may be connected to any desirable part of the refrigerating system. As the pressure within the system builds up the bellows 207 will actuate a rod 209 to engage a contact 210 with a contact 211. For the purpose of illustration, I have shown a pressure responsive switch, however, it is to be understood that any switch whether automatically or manually operated may be used.

The closing of contacts 210 and 211 will complete a circuit between the motor 204 contained in the power circuit 200, and the battery 45. The circuit from the battery 45 through the power circuit 200 is as follows: battery 45, wires 50, 51 and 52, winding 53 of control 41, wire 55, contacts 57 and 58, service main 59, service main 215 including contacts 210 and 211, wire 216, translating device or motor 204, wire 217, service main 220, current coil 221 of switch 202 and wire 222 to the other side of the battery. Thus the motor 214 will be started by receiving current from the battery 45.

If the demand for current by the motor 204 continues for a predetermined length of time, the switch 202 is adapted to respond to such demand, after said predetermined length of time, to complete the necessary electrical circuits for rendering the prime mover operative. The switch 202 includes the thermostatic blade 225, which blade is fixed at contact point 226, and a heating coil 227. The energization of coil 221 will cause the upward movement of an armature 228 to engage a contact 229 with a contact 230. The closing of contacts 229 and 230 will complete a circuit between the battery 45 and the heating coil 227. The circuit from the battery through the heating coil 227 may be traced as follows: battery 45, wire 50, wire 80, blades 81 and 82, wire 83, wire 111, wire 232, contacts 229 and 230, wire 233, connecting point 226, heating coil 227, wire 235, coil 221, wire 222 to the other side of the battery.

The thermostatic blade 225 is in heat receiving relation with the heating coil 227, and in the event that the demand for current continues for a predetermined length of time the blade 225 will be heated sufficiently to cause it to bow to the right, as viewed in the drawing, to cause a contact 237, carried by the blade 225, to engage a contact 238. Thus it will be noted that as long as there is a demand for current by the power circuit, the current will continue to flow through the heating coil 227 to cause the closing of contacts 237 and 238, after a predetermined length of time, and to then maintain said contacts closed as long as such demand continues.

The closing of contacts 237 and 238 will complete the necessary electrical circuits for rendering the prime mover operative, including circuit through the magnet coil 92 of starting switch 93, ignition, preheater, shunt winding 128 of relay 63, and heating coil 135 of cranking cut-out 136. The circuit from the battery through the contacts 237 and 238 and the circuit for starting the prime mover is as follows: battery 45, wires 50 and 80, blades 81 and 82, wires 83, 111 and 232, contacts 229 and 230, wire 233 to connecting point 226, where the current divides, part passing through the heating coil 227 and the other part passing through blade 225, contacts 237 and 238, wire 240 to armature 75 where the wire 240 joins wires 85 and 125, the current flows through wires 85 and 125 to the various starting circuits as previously described. When the demand for current by the work circuit 200 ceases the circuit through the heating coil 227 is thereby interrupted by the deenergization of coil 221. When the circuit through the heating coil 227 is interrupted the thermostatic blade 225 will assume the position shown in the drawing and in so doing will separate contact 237 from contact 238. The separation of contacts 237 and 238 will interrupt the necessary circuits for maintaining the prime mover operative to thus render the system inoperative.

In certain types of systems used for household purposes where the demand for current continues for a period, for example, four to five minutes or longer it has been found desirable to have the system rendered operative to supply the demand to thus prevent a heavy drain on the battery. In other types of systems where the demand for current is present only for a very short interval it has been found desirable to prevent the operation of the system to supply the demand.

From the foregoing it will be apparent that I have provided an electrical generating system adapted for supplying current to translating devices requiring large amounts of current, and in which the system will be rendered automatically operative by a demand for current by the device, when the demand for current continues for a predetermined length of time. It is an advantage to prevent the operation of the system for short intervals, for example, numerous demands by a water pump, thereby conserving fuel. Also, it is an advantage to delay the operation of the prime mover to thus prevent a simultaneous demand on the battery for starting current by the large translating device and for a demand for cranking current for rendering the prime mover operative, thereby preventing a heavy drain on the battery.

While the form of embodiment of the invention as herein disclosed, constitutes a preferred form, it is to be understood that other forms might be adopted, all coming within the scope of the claims which follow.

What is claimed is as follows:

1. An electrical generating system comprising in combination a work circuit, a relatively large translating device contained in the work circuit, a storage battery adapted for supplying current to the work circuit, a prime mover, electrical apparatus adapted for rendering the prime mover operative and being adapted to be driven by the prime mover for supplying current to the work circuit, means for preventing a simultaneous demand for current on the storage battery for starting current by said translating device and for starting current by the electrical apparatus for rendering the prime mover operative, and means responsive to a demand for current by the translating device for controlling said first named means.

2. An electrical generating system comprising in combination a work circuit, a large translating device contained in the work circuit, a storage battery for supplying current to said work circuit, a prime mover, electrical apparatus adapted for rendering the prime mover operative and being adapted to be driven by the prime mover for supplying current to the work circuit, a control circuit for controlling the flow of starting current to said electrical apparatus, a switch comprising a bi-metallic thermostatic blade in said control circuit for preventing a simultaneous demand for current on the storage battery for starting current by said translating device and for starting current by the electrical apparatus for rendering the prime mover operative, a heating coil arranged for applying its heat to said blade for causing said blade to close said control circuit after a predetermined length of time, and means responsive to a demand for current by said translating device for controlling said heating coil.

In testimony whereof I hereto affix my signature.

FRANK F. STARR.